US009021152B2

(12) United States Patent
Hackborn et al.

(10) Patent No.: US 9,021,152 B2
(45) Date of Patent: Apr. 28, 2015

(54) METHODS AND SYSTEMS FOR DETERMINING MEMORY USAGE RATINGS FOR A PROCESS CONFIGURED TO RUN ON A DEVICE

(71) Applicant: Google Inc., Mountain View, CA (US)

(72) Inventors: Dianne Kyra Hackborn, Mountain View, CA (US); Michael Andrew Cleron, Menlo Park, CA (US); Alexander Charles Schrepfer, Mountain View, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 14/139,125

(22) Filed: Dec. 23, 2013

(65) Prior Publication Data
US 2015/0095521 A1   Apr. 2, 2015

Related U.S. Application Data

(60) Provisional application No. 61/884,278, filed on Sep. 30, 2013.

(51) Int. Cl.
*G06F 3/00* (2006.01)
*G06F 9/45* (2006.01)
*G06F 3/06* (2006.01)

(52) U.S. Cl.
CPC ............ *G06F 3/0653* (2013.01); *G06F 3/0608* (2013.01); *G06F 3/0673* (2013.01)

(58) Field of Classification Search
None
See application file for complete search history.

(56) References Cited

U.S. PATENT DOCUMENTS

| | | | |
|---|---|---|---|
| 6,049,798 A | 4/2000 | Bishop et al. | |
| 2004/0030777 A1* | 2/2004 | Reedy et al. | 709/224 |
| 2004/0139186 A1* | 7/2004 | Lee et al. | 709/223 |
| 2005/0086652 A1* | 4/2005 | Tian et al. | 717/151 |
| 2008/0163233 A1* | 7/2008 | Kobayashi | 718/104 |
| 2013/0061167 A1 | 3/2013 | Rhodes et al. | |
| 2013/0067381 A1 | 3/2013 | Yalovsky et al. | |
| 2013/0132872 A1 | 5/2013 | Milirud et al. | |

OTHER PUBLICATIONS

"Instruments User Guide", accessed Dec. 23, 2013, https://developer.apple.com/library/mac/documentation/DeveloperTools/Conceptual/InstrumentsUserGuide/MemoryManagementforYouriOSApp/MemoryManagementforYouriOSApp.html#//apple_ref/doc/uid/TP40004652-CH11-SW1.
Gilson, "How to use Windows 8 Task Manager", CNET, accessed Dec. 23, 2013, http://reviews.cnet.co.uk/ software-and-web-apps/how-to-use-windows-8-task-manager-50008713/.
International Search Report and the Written Opinion of the International Searching Authority for international application No. PCT/US20141057622 (mailed Dec. 11, 2014).

* cited by examiner

*Primary Examiner* — Hyun Nam
(74) *Attorney, Agent, or Firm* — McDonnell Boehnen Hulbert & Berghoff LLP

(57) ABSTRACT

Methods and systems for determining memory usage ratings for system processes and providing for display are described. An example method may include determining, by a processor, a memory usage value for a process configured to run on a computing device over a time period, and the memory usage value is indicative of an amount of memory of the computing device that the process uses while running. The method may also include determining a memory usage rating for the process based on the memory usage value and a run time for the process. The memory usage rating for the process indicates an amount of memory the process uses over the time period and the run time indicates how long the process runs during the time period. The method may also include providing for display, by the processor, a representation of the memory usage rating of the process over the time period.

21 Claims, 13 Drawing Sheets

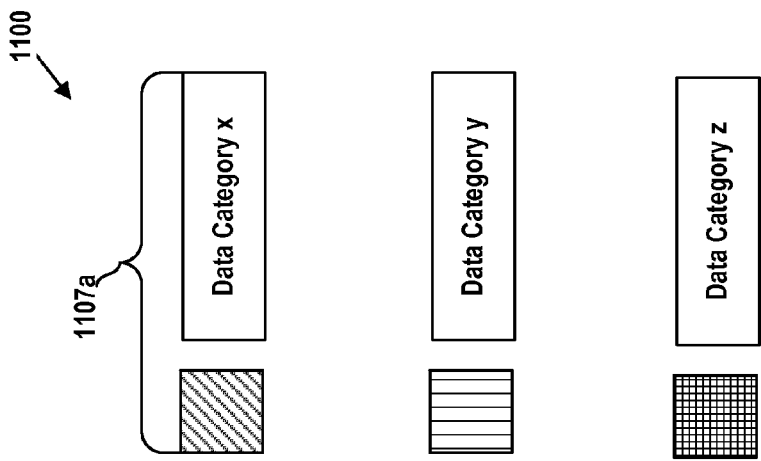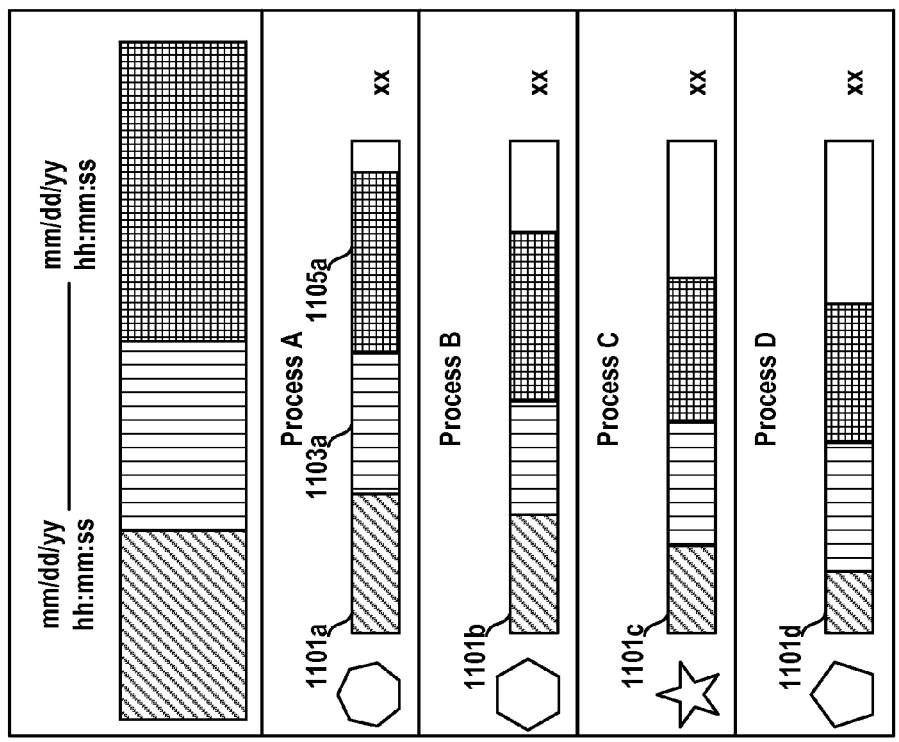
FIG. 11

METHODS AND SYSTEMS FOR DETERMINING MEMORY USAGE RATINGS FOR A PROCESS CONFIGURED TO RUN ON A DEVICE

CROSS REFERENCE TO RELATED APPLICATION

The present disclosure claims priority to U.S. Provisional Patent Application No. 61/884,278, filed on Sep. 30, 2013, the entire contents of which are herein incorporated by reference.

BACKGROUND

Unless otherwise indicated herein, the materials described in this section are not prior art to the claims in this application and are not admitted to be prior art by inclusion in this section.

Many types of computing devices have integrated memory systems that are used as run time space for various processes and applications. Memory usage data of a computing device can be analyzed and displayed using several techniques. For example, a computing system may survey the memory used by each process or application at a specific instant and display that information. A format of the display may be sortable with respect to process name or an amount of memory used by each process. The memory usage data may be expressed numerically or graphically. The memory usage data may correspond to processes that are running at the same instant that the memory usage data is displayed. This type of display would change as memory usage details change in real time.

SUMMARY

In one example, a method is provided that includes determining, by a processor, a memory usage value for a process configured to run on a computing device over a time period, and the memory usage value is indicative of an amount of memory of the computing device that the process uses while running. The method further includes determining a memory usage rating for the process based on the memory usage value and a run time for the process. The memory usage rating for the process indicates an amount of memory the process uses over the time period and the run time indicates how long the process runs during the time period. The method further includes providing for display, by the processor, a representation of the memory usage rating of the process over the time period.

In another example, a computer readable storage memory having stored therein instructions, that when executed by a processor, cause the processor to perform functions is provided. The functions comprise determining a memory usage value for a process configured to run on a computing device over a time period, and the memory usage value is indicative of an amount of memory of the computing device that the process uses while running. The functions also comprise determining a memory usage rating for the process based on the memory usage value and a run time for the process. The memory usage rating for the process indicates an amount of memory the process uses over the time period and the run time indicates how long the process runs during the time period. The functions further comprise providing for display a representation of the memory usage rating of the process over the time period.

In still another example, a system is provided that comprises one or more processors and memory configured to store instructions, that when executed by the one or more processors, cause the system to perform functions. The functions comprise determining a memory usage value for a process configured to run on a computing device over a time period, and the memory usage value is indicative of an amount of memory of the computing device that the process uses while running. The functions also comprise determining a memory usage rating for the process based on the memory usage value and a run time for the process. The memory usage rating for the process indicates an amount of memory the process uses over the time period and the run time indicates how long the process runs during the time period. The functions further comprise providing for display a representation of the memory usage rating of the process over the time period.

In yet another example, a system is provided that includes a means for determining, a memory usage value for a process configured to run on a computing device over a time period, and the memory usage value is indicative of an amount of memory of the computing device that the process uses while running. The system further includes a means for determining a memory usage rating for the process based on the memory usage value and a run time for the process. The memory usage rating for the process indicates an amount of memory the process uses over the time period and the run time indicates how long the process runs during the time period. The system further includes a means for providing for display, a representation of the memory usage rating of the process over the time period.

These as well as other aspects, advantages, and alternatives, will become apparent to those of ordinary skill in the art by reading the following detailed description, with reference where appropriate to the accompanying figures.

BRIEF DESCRIPTION OF THE FIGURES

FIG. 11 illustrates an example format for displaying representations of overall memory usage ratings of processes based on memory usage values aggregated across multiple computing devices categorized by various states.

DETAILED DESCRIPTION

Figure 1:
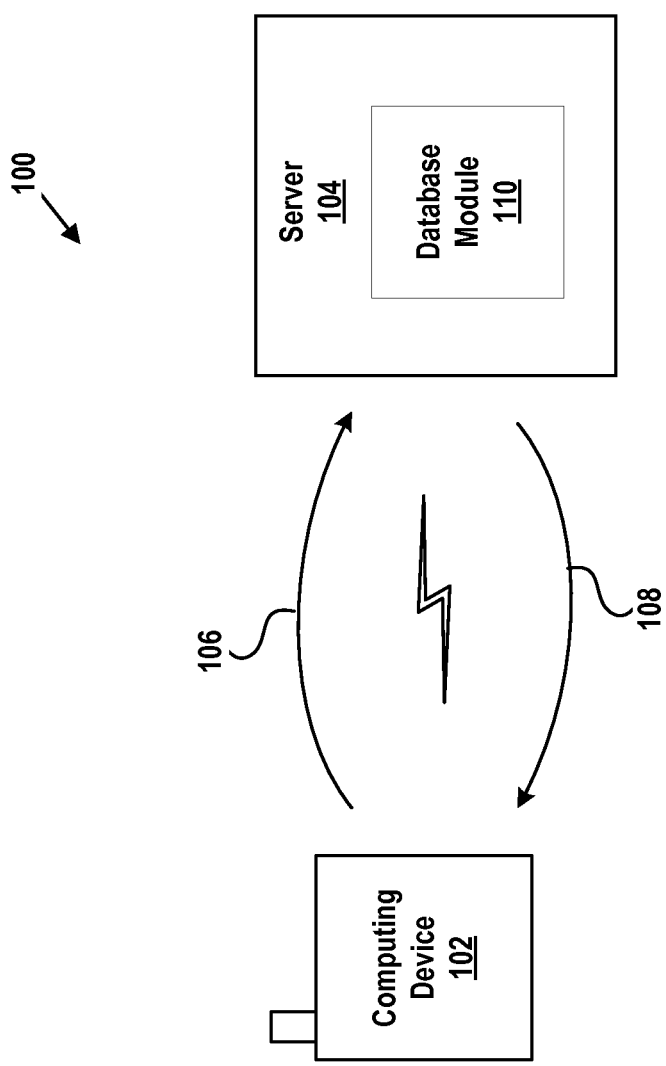
FIG. 1 illustrates an example communication system by which an example method may be implemented.

The following detailed description describes various features and functions of the disclosed systems and methods with reference to the accompanying figures. In the figures, similar symbols identify similar components, unless context dictates otherwise. The illustrative system and method embodiments described herein are not meant to be limiting. It may be readily understood that certain aspects of the disclosed systems and methods can be arranged and combined in a wide variety of different configurations, all of which are contemplated herein.

Within examples, a computing device may be configured to provide information indicating an amount of memory used by a process running on the computing device over time by performing a series of instantaneous memory usage measurements for the process, storing and aggregating the instantaneous measurements of memory used by the process, determining a memory usage rating for the process based on the memory used by the process over time, and displaying memory usage ratings of the process. Processes may include any executable program, including applications. The memory usage rating associated with the process may represent a percentage of total memory of the computing device used by the process or may represent an absolute amount of memory used by the process. The memory usage rating may also represent the amount of memory used by the process expressed as a relative weight compared to an amount of memory used by another process. In addition, the memory usage rating may represent the amount of memory used by the process over time, expressed as a percentage of total memory consumed by all processes running on the computing device over time. The memory usage rating may be expressed in units of megabytes or megabyte-seconds, or any units representing memory or a multiplicative product of memory and time.

The memory usage rating may be categorized and displayed with respect to process state, system memory state, or interaction state. Memory used by the process may also be displayed as maximum, minimum, or average memory usage values. In some examples, the computing device may be configured to display how much the process is running over time, in what states the process is running, and aggregated memory usage by the process across the states.

In other examples, a server may be configured to provide information indicating an amount of memory used by the process running on multiple computing devices over time by collecting from the multiple computing devices memory usage data associated with the process running on the devices, storing and aggregating the data, determining overall memory usage ratings for the process based on memory usage values of the process running on the multiple computing devices, and displaying an overall memory usage rating for the process that is indicative of the amount of memory the process has used on the multiple computing devices. The server may be further configured to display overall memory usage ratings for the process further categorized by the type of computing device running the process and the type of operating system running the process on the computing devices. Additionally, the server may be configured to display a minimum, maximum, or average memory usage value for the process running on the multiple computing devices. The server may be further configured to display memory usage ratings for the process, categorized by process state, system memory state, or interaction state.

Referring now to the figures, FIG. 1 illustrates an example communication system 100 by which an example method may be implemented. The system 100 includes a computing device 102 that may communicate with a server 104 via one or more wired and/or wireless interfaces. The computing device 102 and the server 104 may communicate within a network. Alternatively, the computing device 102 and the server 104 may each reside within a respective network.

The computing device 102 may be any type of computing device or transmitter including a laptop computer, a mobile telephone, or tablet computing device, etc., that is configured to transmit data 106 to, or receive data 108 from, the server 104 in accordance with the method and functions described herein. The computing device 102 may include a user interface, a communication interface, a processor, and data storage comprising instructions executable by the processor for carrying out one or more functions relating to the data sent to, or received by, the server 104. The user interface may include buttons, a touchscreen, a microphone, and/or any other elements for receiving inputs, as well as a speaker, one or more displays, and/or any other elements for communicating outputs.

The server 104 may be any entity or computing device arranged to carry out the method and computing device functions described herein. Server 104 may include the same components as computing device 102. Further, the server 104 may be configured to send data 108 to or receive data 106 from the computing device 102. The server 104 may have a database module 110 configured to receive data from multiple computing devices, to aggregate and store the data, and to provide for display the data in various forms.

The data 106 received by the server 104 from the computing device 102 may take various forms. For example, the computing device 102 may provide data regarding memory use trends of processes or applications running on the computing device 102. The server 104 may then store and aggregate the data for display.

The data 108 sent to the computing device 102 from the server 104 may take various forms. For example, the server 104 may send to the computing device 102 a request for data pertaining to memory usage on the computing device 102. Additionally, the server 104 may send data regarding a process configured to run on the computing device 102, including data regarding memory usage trends for the process while the process was running on other computing devices.

Figure 2:
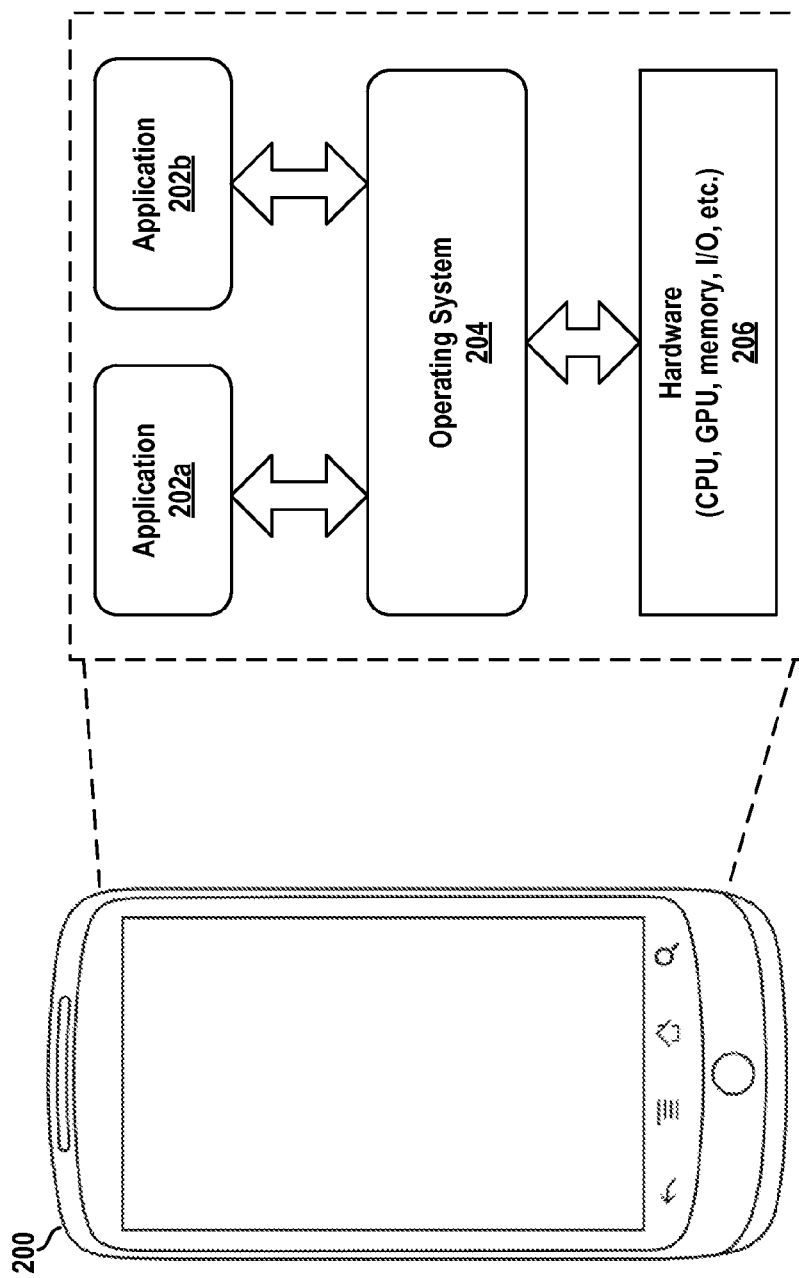
FIG. 2 illustrates an example computing device by which an example method may be implemented.

FIG. 2 illustrates an example computing device 200 by which an example method may be implemented. Computing device 200 may include applications 202a and 202b and an operating system 204 being executed by hardware 206. Although the example computing device 200 is a smartphone, aspects of this disclosure are applicable to other computing devices such as PCs, laptops, tablet computers, etc.

Each of the applications 202a and 202b may include instructions that when executed cause the computing device 200 to perform specific tasks or functions. Applications 202a and 202b may be native applications (i.e., installed by a manufacturer of the computing device 200 and/or a manufacturer of the operating system 204) or may be a third-party application installed by a user of the computing device 200 after purchasing the computing device. A non-exhaustive list of example applications includes: a media player application that accepts media files as inputs and generates corresponding video and/or audio to the output device(s); an e-reader application which accepts electronic documents (books, magazines, etc.) as input and presents the content of the document via the output device(s); a feed reader that accepts feeds delivered over the Internet (e.g., RSS feeds and/or feeds from social network sites) as input and presents the feeds via the output device(s); a map application that displays a map via the output device(s); a note-taking application, a bookmarking application, and a word processing, spreadsheet, and/or presentation application that accepts specifically formatted files as inputs and presents them via the output devices for viewing and/or editing.

The operating system 204 may interact with and manage hardware 206 to provide services for the applications 202a and 202b. For example, an application 202a may request that the operating system 204 direct an integrated camera of hardware 206 to capture a visual image and that the hardware 206 store the image to memory.

The hardware 206 may include, for example, a central processing unit (CPU), a graphics processor (GPU), memory, an input/output (I/O) interface, user input device(s), and output device(s). Components of hardware 206 may be controlled by instructions contained in applications 202a and 202b and operating system 204.

The central processing unit (CPU) may be operable to effectuate the operation of the computing device 200 by executing instructions stored in memory or disk storage. Such instructions may include the operating system 204 and the applications 202a and 202b. The CPU may, for example, comprise a single or multi-core processor, an application specific integrated circuit (ASIC), field programmable gate array (FPGA), and/or any other suitable circuitry.

The graphics processor may be operable to generate a video stream for output to the screen based on instructions and/or data received from the CPU. That is, data structures corresponding to images to be displayed on the screen may be stored to and read from the memory or disk storage by the CPU. The CPU may convey such data structures to the graphics processor via a standardized application programming interface (API) such as, for example, Standard Widget Toolkit (SWT), the DirectX Video Acceleration API, the Video Decode Acceleration Framework API, or other suitable API.

The memory may include program memory and run-time memory. The memory may, for example, comprise non-volatile memory, volatile memory, read only memory (ROM), random access memory (RAM), flash memory, magnetic storage, and/or any other suitable memory. Program memory may store instructions executable by the CPU to effectuate operation of the operating system 204 and the applications 202a and 202b. Runtime memory may store data generated or used during execution of the operating system 204 or applications 202a and 202b.

The input/output (I/O) interface may be operable to receive signals from the input device(s), and provide corresponding signals to the CPU and/or the graphics processor.

The input device(s) may include, for example, a mouse, a touchpad, a motion sensor, a trackball, a voice recognition device, a keyboard, or any other suitable input device which enables a user to interact with the computing device 200.

The output devices may include, for example, a screen and speakers. The screen may be, for example, a liquid crystal display (LCD) screen, a OLED screen, an e-ink screen, and/or any other suitable device for presenting a graphical user interface.

Figure 3:
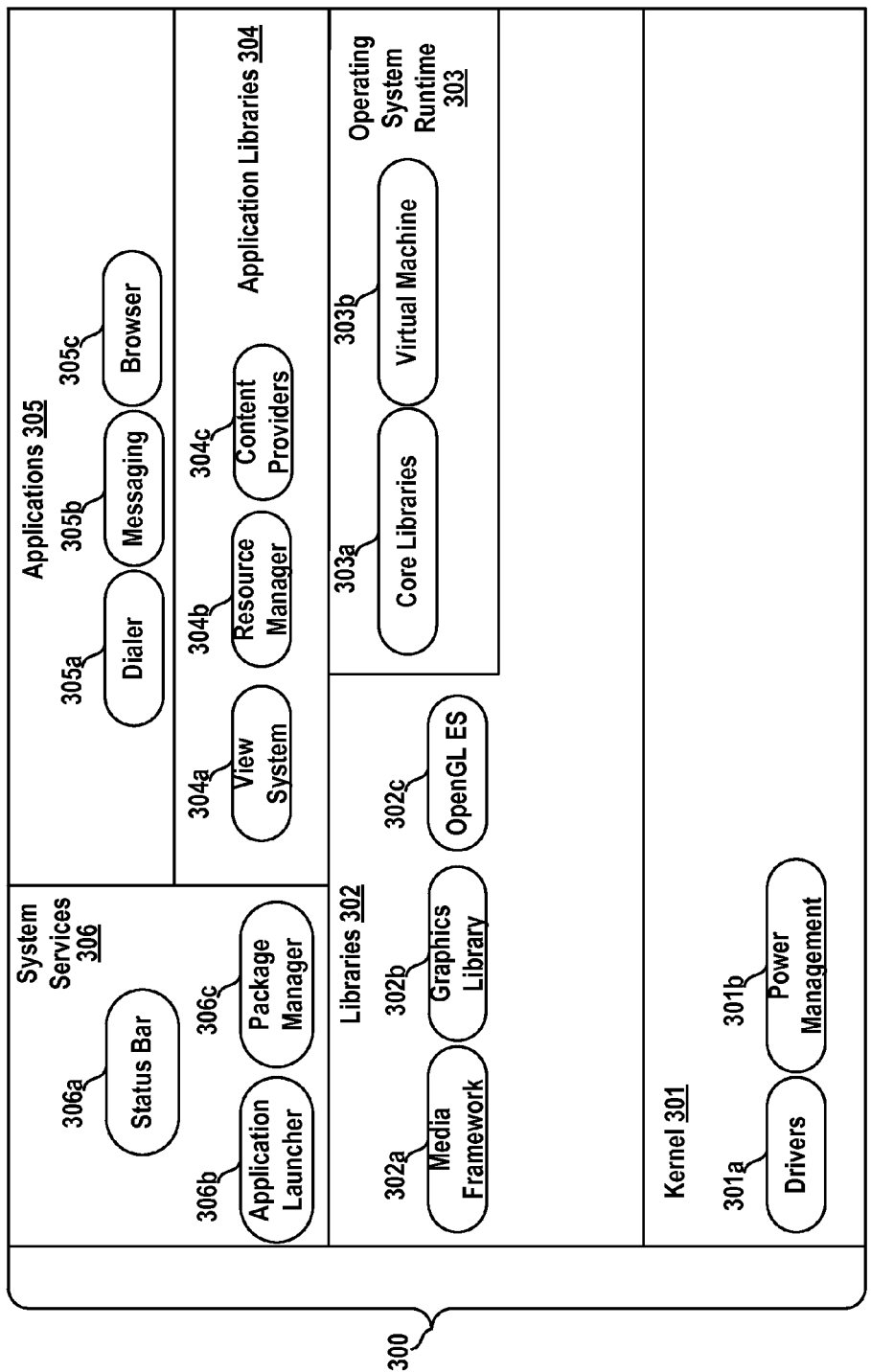
FIG. 3 is a block diagram illustrating example components of an operating system used by the computing device of FIG. 2.

FIG. 3 is a block diagram illustrating possible components of an operating system 300 used by a computing device. The operating system 300 may invoke multiple processes, while ensuring that an associated phone application is responsive, and that wayward applications do not cause a fault of the operating system 300. Using task switching, the operating system 300 may allow for the switching of applications while on a telephone call, without losing the state of each associated application. The operating system 300 may use an application framework to enable reuse of components, and provide a scalable experience by combining pointing device and keyboard inputs and by allowing for pivoting. The operating system 300 may generally be organized into components including a kernel 301, libraries 302, an operating system runtime 303, application libraries 304, applications 305, and system services 306.

The kernel 301 may include drivers 301a that enable software such as the operating system 300 and applications 306 to interact with input/output devices. The kernel 301 may also include power management processes 301b that coordinate hardware power usage and provide alerts when an integrated battery is running low on power, for example.

The libraries 302 may include several subcomponents, such as media framework 302a, graphics library 302b, and OpenGL ES 302c. The media framework 302a may include functionality that supports standard video, audio and still-frame formats. The graphics library 302b may support two-dimensional application drawing. The OpenGL ES 302c may support gaming and three-dimensional graphics rendering.

The operating system runtime 303 may include core libraries 303a and virtual machines 303b. The virtual machines 303b may be custom virtual machines that run a customized file format. The virtual machines 303b may be used with an embedded environment since the virtual machines 303b use runtime memory efficiently, implement a CPU optimized bytecode interpreter, and support multiple virtual machine processes per device.

The application libraries 304 may include libraries for view system 304a, resource manager 304b, and content providers 304c. These application libraries may provide support for applications 305.

The applications 305 may include any number of applications, such as a dialer 305a, messaging 305b, and a browser 305c. The dialer 305a may provide functionality related to placing or receiving phone calls. The messaging 305b may provide functionality related to receiving and sending messages, such as email, voice mail, or text messages. The browser 305c may provide functionality related to sending or receiving information via the world wide web.

The system services 306 may include status bar 306a, application launcher 306b, and package manager 306c. The status bar 306a may provide functionality related to providing system notifications. The application launcher 306b may provide functionality related to organization and execution of applications 305. The package manager 306c may maintain information for installed applications 305.

Figure 4:
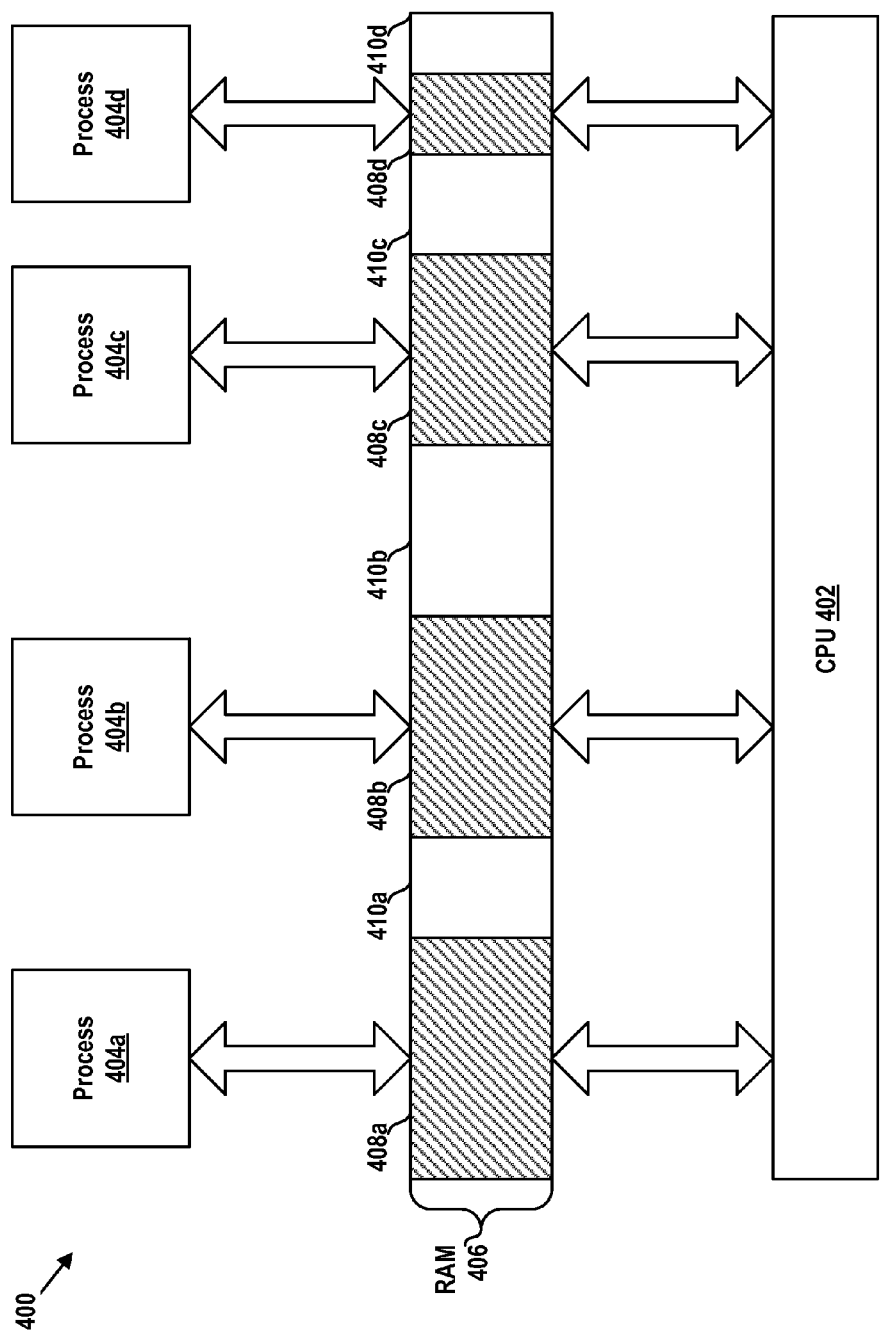
FIG. 4 illustrates example components or portions of a computing device.

FIG. 4 illustrates example components of a computing device 400. Such components or portions may include a CPU 402, processes 404a, 404b, 404c, and 404d, and a RAM 406.

The CPU 402 may execute instructions contained in memory, including processes 404a-d, causing data to be written to and retrieved from the RAM 406. The RAM 406 may then be composed of used memory spaces 408a-d, and unused memory spaces 410a-d. The used memory spaces 408a-d may contain data and be unavailable for further storage. The CPU 402 may leave the unused memory spaces 410a-d undisturbed and available for storage.

The CPU 402 may execute another process that causes the used memory spaces 408a-d and the unused memory spaces 410a-d to be intermittently analyzed during a time period of interest. For example, the CPU 402 may determine whether the processes 404a-d are running, and if any of the processes 404*a-d* are running, the CPU 402 may log a respective process run time for each running process. The CPU 402 may then be configured to determine respective memory usage values corresponding to how much used memory space 408*a-d* is respectively consumed by any running processes 404*a-d* during the run times. The CPU 402 can also log a process state of the running processes 404*a-d*.

Many types of process states exist for running processes. Some example process states include PROCESS_STATE_PERSISTENT that indicates a process that runs often and provides system functionality, and PROCESS_STATE_PERSISTENT_UI that indicates a process that runs often and provides system functionality while providing or receiving input or output data. Other example process states include PROCESS_STATE_TOP that indicates a process that is providing services relating to an ongoing operation using a user input/output interface, PROCESS_STATE_FOREGROUND that indicates a process that is running in the foreground, and PROCESS_STATE_BACKGROUND that indicates a process that is running in the background. Some further example process states include PROCESS_STATE_BACKUP that indicates a process performing backup or restore functions in the background, PROCESS_STATE_HEAVY_WEIGHT that indicates an unrestoreable background process designated not to be terminated, PROCESS_STATE_SERVICE that indicates a background process running a service, PROCESS_STATE_RECEIVER that indicates a background process running a receiver, PROCESS_STATE_HOME that indicates a background process hosting a home activity, and PROCESS_STATE_LAST_ACTIVITY that indicates a background process hosting the last shown activity. Some process states are indicative of cached functions, such as PROCESS_STATE_CACHED_ACTIVITY that indicates a process that contains activities but is cached for later use, PROCESS_STATE_CACHED_ACTIVITY_CLIENT that indicates a process cached for later use that is a client of another cached process that contains activities, and PROCESS_STATE_CACHED_EMPTY that indicates an empty process cached for later use. Process states may also include indications of an operating system environment the process is running in, a model of computing device the process is running on, whether input or output devices are receiving input or providing outputs to or from a user interface while the process is running, or a state of availability of the system memory while the process is running.

The CPU 402 can also be configured to determine a system memory state of the RAM 406, which may be indicative of the amount of unused memory space 410*a-d* available for further storage. System memory states may describe a percentage of storage space of the RAM 406 that is being used by the processes 404*a-d*. Alternatively, system memory states may indicate a quantity of processes 404*a-d* using storage space of RAM 406. System memory states may include "good", which may describe a state where more than a predetermined number of processes are consuming storage space at RAM 406. By further example, system memory states "poor" and "low" may describe states where less than a predetermined number of processes are consuming storage space at RAM 406, leaving other processes without memory to use.

The CPU 402 can also be configured to determine interaction states of the processes 404*a-d*, which may be indicative of whether the CPU 402 is providing data for display or receiving input from an input device while the respective processes are running. An example interaction state may describe an instance when the CPU 402 is providing data for display or receiving input from an input device while another interaction state may describe an instance when the CPU 402 is not providing data for display and not receiving input from an input device.

The CPU 402 may also be instructed to aggregate and store to memory measurements of respective process run times, memory usage values corresponding to respective processes, and also process states, system memory states, or interaction states corresponding to respective processes at the time of measurement. In addition, the CPU 402 may be instructed to determine memory usage ratings for the respective processes 404*a-d*. In one example, the CPU 402 may determine a run time for each process and then determine one or more memory usage values indicative of the amount of the RAM 406 being used by respective processes 404*a-d* at various times during a time period of interest. The CPU 402 may be further instructed to determine an average, minimum, maximum, median, or mode memory usage value during the time period of interest based on the amount of the RAM 406 being consumed by the processes 404*a-d* at various times during a time period of interest. Additionally, the CPU 402 may be instructed to determine a memory usage rating for each respective process 404*a-d* by multiplying the respective run time by a memory usage value for each process.

The processes 404*a-d* may represent any program the CPU 402 is capable of executing. When executed the processes may require the RAM 406 to store associated data. The processes 404*a-d* may be executed by the CPU 402 for various amounts of time, thereby causing data to be stored at the used memory spaces 408*a-d*, respectively. The CPU 402 executing the processes 404*a-d* may cause the used memory spaces 408*a-d* to remain unavailable for further storage. Processes 404*a-d* may leave the unused memory spaces 410*a-d* undisturbed and available for further data storage.

The RAM 406 may store information within the computing device 400. In one implementation, the RAM 406 is a volatile memory unit or units. In another implementation, the RAM 406 is a non-volatile memory unit or units. The RAM 406 may also be another form of computer-readable medium, such as a magnetic or optical disk. Furthermore, the RAM 406 may include a finite amount of storage space that is accessible to the CPU 402. Depending on the state of the CPU 402 and the processes 404*a-d*, the RAM 406 may include varying amounts of used memory spaces 408*a-d* and unused memory spaces 410*a-d*. The used memory spaces 408*a-d* may represent sections of the RAM 406 that are being used for storage by the processes 404*a-d* executed by the CPU 402, while the unused memory states 410*a-d* may be the portions of the RAM 406 that the CPU 402 has left undisturbed.

Figure 5:
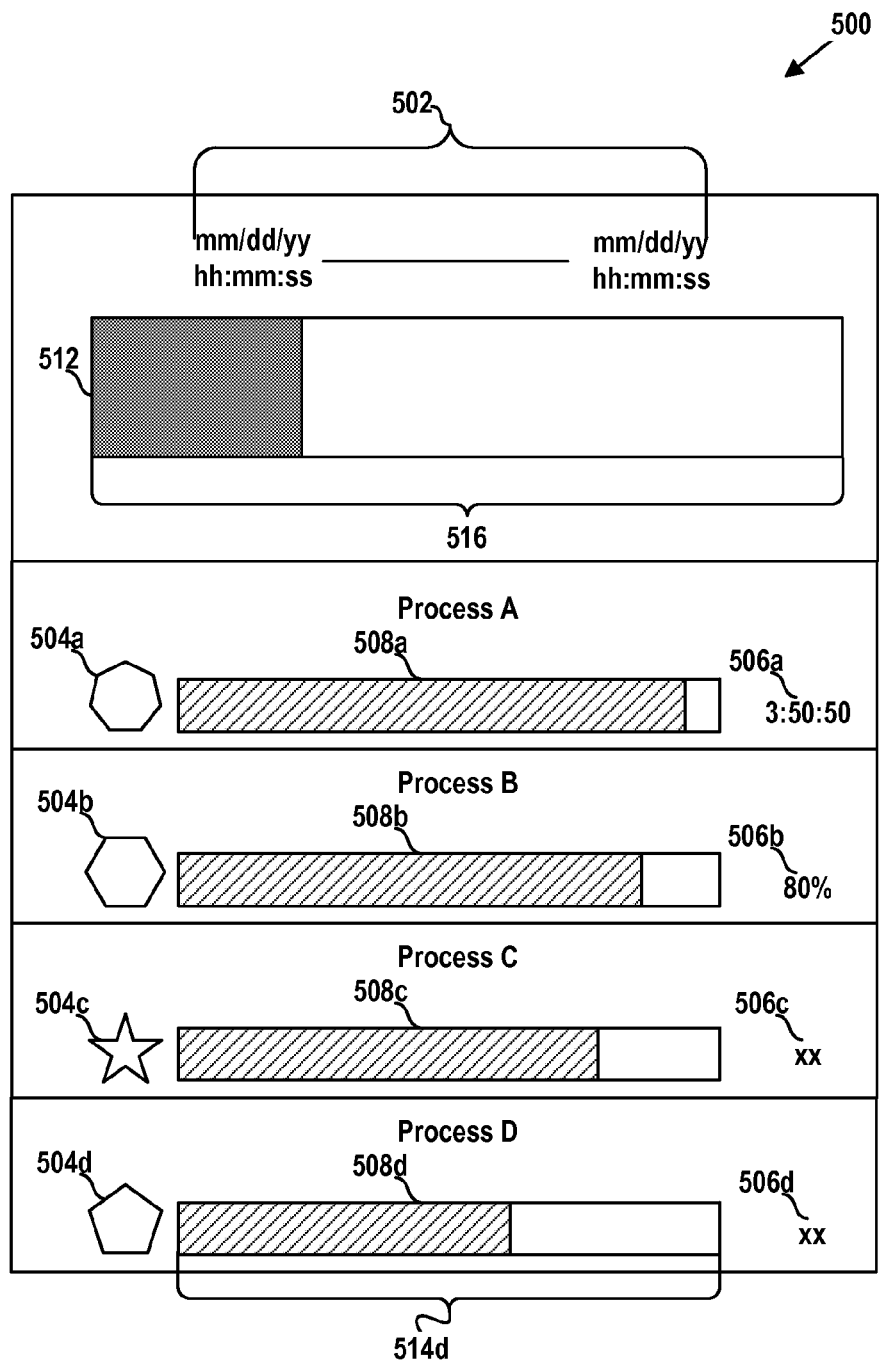
FIG. 5 illustrates an example format for displaying representations of memory usage ratings of processes.

FIG. 5 illustrates an example format 500 for displaying representations of memory usage ratings of processes. The CPU may be instructed to provide for display representations of time period indicator 502, process indicator icons 504*a-d*, process run time indicators 506*a-d*, memory usage rating indicator bars 508*a-d*, and system memory state indicator bar 512.

The time period indicator 502 may be an alphanumeric representation of a time period of interest when the CPU was collecting memory usage data with respect to processes A, B, C, or D. For example, the time period indicator 502 may include a start time/date and an end time/date pertaining to when the CPU respectively began and ceased to collect the memory usage data being displayed. The time period indicator 502 may also indicate that the CPU is still collecting memory usage data in real time.

The process indicator icons 504*a-d*, may be visual representations of processes A, B, C, or D, respectively. The Process indicator icons 504*a-d* may be indicative of the identity or function of a process or application for which data is being displayed. The process indicator icons 504a-d may be visual depictions of the functions of the respective processes or may be symbols otherwise recognizable as being associated with the processes. For example, the process indicator icon 504a may appear to be a visual depiction of a notepad and represent a process associated with a word processor.

The process run time indicators 506a-d may be alphanumeric representations of an absolute time respective processes A, B, C, or D have run during the time period of interest. The process run time indicators 506a-d may also be alphanumeric representations of a ratio or percentage of time the respective process A, B, C, or D have run during the time period of interest as compared to the time period of interest as a whole. For example, the process run time indicator 506a may appear as "3:50:50" which may indicate that process A has run for three hours fifty minutes and fifty seconds during the time period of interest. As a further example, the process run time indicator 506b may appear as "80%" which may indicate that process B has run for eighty percent of the time period of interest.

The memory usage rating indicator bars 508a-d may be graphical representations of the memory usage ratings for the respective processes A, B, C, and D. The memory usage rating for a process may be a multiplicative product of (1) a time the process has run during the time period of interest and (2) an average amount of RAM consumed by the process during the time period of interest. The memory usage rating may also be expressed as a ratio or percentage of the multiplicative product of (1) the total system memory available at the RAM and (2) the duration of the time period of interest. Both the memory usage rating and the total system memory available during the time period of interest may be expressed in units of megabyte-hours or megabyte-seconds. By further example, both the memory usage rating and the total system memory available during the time period of interest may be expressed in any unit that represents a multiplicative product of memory and time. Alternatively, the memory usage rating may represent an amount of RAM consumed by the process at an instant in time.

For example, the memory usage rating indicator bar 508d may span 60% of a length allotted 514d for the memory usage rating indicator bar 508d. A length of the memory usage rating indicator bar 508d may indicate that process D has been determined to use 60% of the total system memory resources during the time period of interest. For example, process D may have run for 75% of the time period of interest and used an average of 80% of the total system memory. In this case, the memory usage rating indicator bar 508d may graphically represent 60% of the memory resources available to the computing system. Additionally, the length of the memory usage rating indicator bar 508d may indicate that process D has been determined to use 60% of the total memory used on the computing device during the time period of interest. For example, process D may have run for 75% of the time period of interest and consumed an average of 80% of the total memory consumed on the computing device during the time period of interest. In this case, the memory usage rating indicator bar 508d may graphically represent 60% of the memory resources consumed on the computing system during the time period of interest. Alternatively, the memory usage rating of process D expressed in megabyte-seconds may be displayed.

The system memory state indicator bar 512 may be indicative of a percentage of time an amount of unused memory space on the computing device has been less than a certain value. For example, the system memory state indicator bar 512 may span approximately 25% of a space available 516 for the system memory state indicator bar 512. This may indicate that the system memory was in a less than optimal state for 25% of the time period of interest. In other examples, the system memory state indicator bar 512 may also be divided to represent multiple system memory states that the computing device assumed during the time period of interest. Furthermore, the system memory state indicator bar 512 may indicate a percentage of time an amount of processes consuming system memory has been more or less than a predetermined amount, or a percentage of time when a certain process was unable to access system memory. For example, the system memory state indicator bar 512 may span approximately 25% of the space available 516 for the system memory state indicator bar. This may indicate that less than a predetermined amount of processes was consuming the system memory for 25% of the time period of interest, or that a certain process was unable to access system memory for 25% of the time of the time period of interest.

The system memory indicator bar 512 may be displayed on an interactive display screen of the computing device and be configured to receive tactile input. Based on receiving tactile input at the system memory indicator bar 512, the computing device may display memory usage data specifically corresponding to a system memory state indicated by the system memory indicator bar 512. For example, the system memory indicator bar 512 may represent an amount of time that less than a predetermined amount of processes have consumed the memory of the computing device, indicating a "poor" system memory state. Upon receipt of an input at the system memory indicator bar 512, the computing device may display memory usage rating indicator bars corresponding only to time periods when less than a predetermined amount of processes were consuming the memory of the computing device or corresponding to time periods when the certain process was unable to access system memory.

Figure 6:
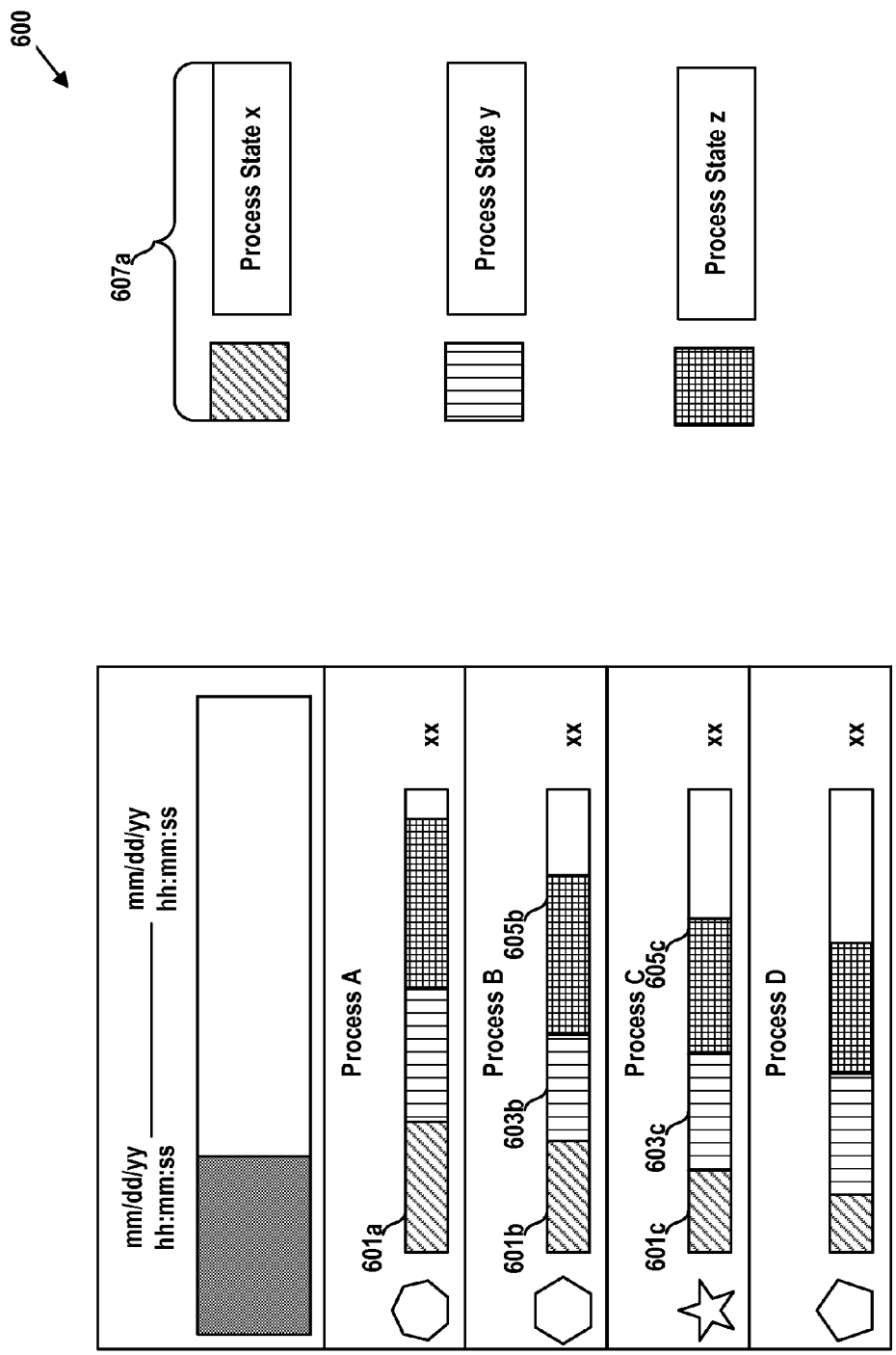
FIG. 6 illustrates an example format for displaying representations of memory usage ratings of processes categorized by process state.

FIG. 6 illustrates an example format 600 for displaying representations of memory usage ratings of processes categorized by process state. Example format 600 may include memory usage rating indicator bars 601a-c, 603b-c, and 605b-c. Example format 600 may also include process state identifier 607a.

As an example, the memory usage rating indicator bar 601a may represent a portion of the memory usage rating associated with process A when process A was running in process state x. The process state identifier 607a may be indicative that the memory usage rating indicator bar 601a represents the portion of the memory usage rating of process A that is attributed to instances when process A was running in process state x. By further example, the memory usage rating indicator bars 601c, 603c, and 605c may together indicate that the memory usage rating for Process C is approximately 75% of available system memory resources during the time period of interest. Alternatively, memory usage rating indicator bars 601c, 603c, and 605c may together indicate that the memory usage rating for Process C is approximately 75% of available system memory resources actually consumed by processes on the computing device during the time period of interest. The memory usage rating indicator bar 601c may indicate that approximately 25% of the memory usage rating of process C of 75% is attributable to instances when Process C was running in process state x. The memory usage rating indicator bar 603c may indicate that approximately 33% of the memory usage rating of 75% is attributable to instances when Process C was running in process state y. The memory usage rating indicator bar 605c may indicate that approximately 42% of the memory usage rating of process C of 75% is attributable to instances when Process C was running in process state z. Displaying memory usage rating indicator bars may be helpful to understand which processes and corresponding process states are consuming system memory resources.

The memory usage rating indicator bars may be displayed on the interactive display screen of the computing device and be configured to receive tactile input. For example, based on receiving tactile input at the memory usage rating indicator bar 601a, the computing device may display memory usage rating indicator bars for respective processes specifically corresponding to a process state indicated by the memory usage rating indicator bar 601a. For example, the memory usage rating indicator bar 601a may represent an amount of time that Process A has run in process state x. Upon receipt of an input at the memory usage rating indicator bar 601a, the computing device may display memory usage rating indicator bars corresponding to time periods when respective processes were running in process state x.

Figure 7:
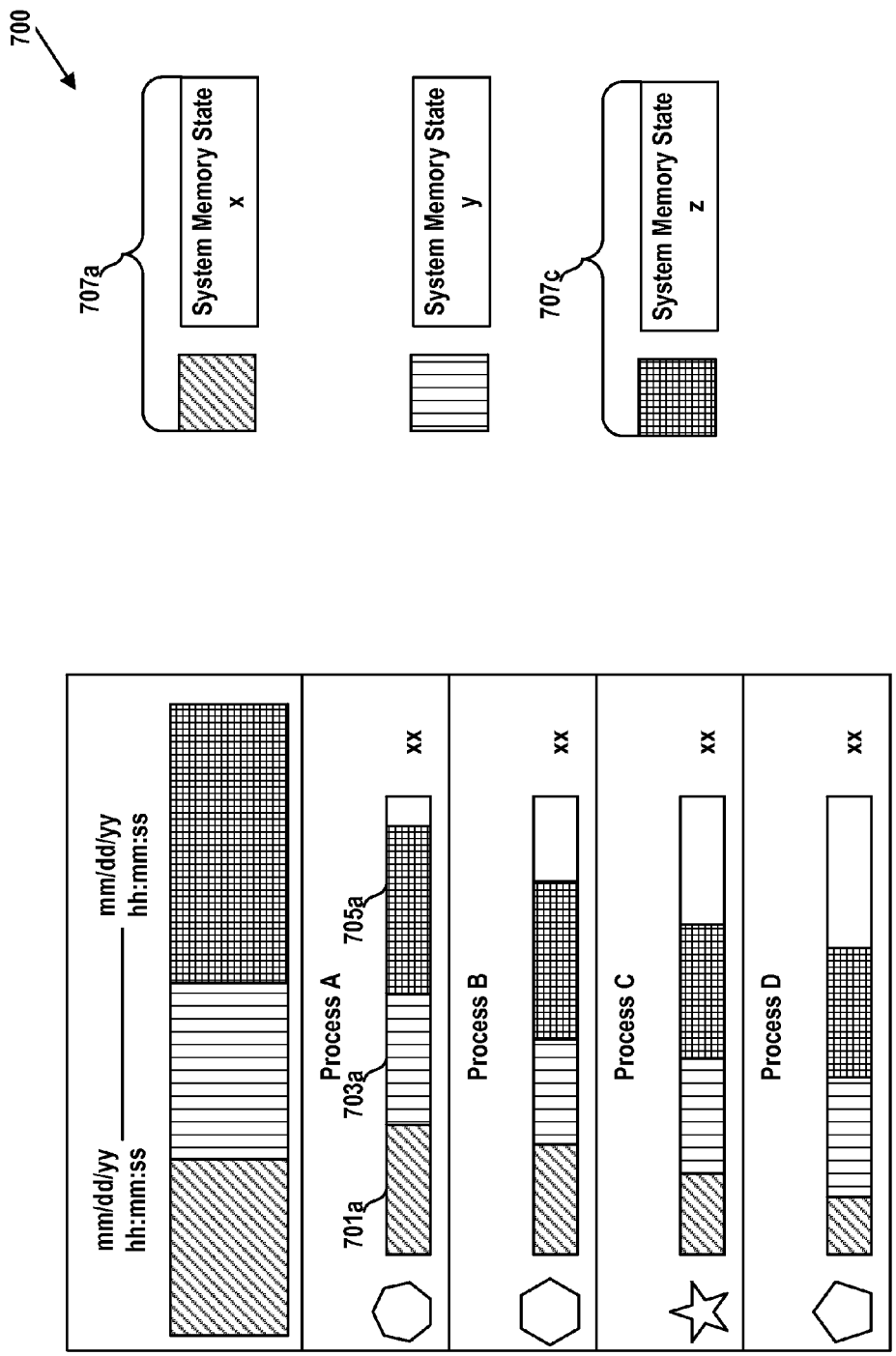
FIG. 7 illustrates an example format for displaying representations of memory usage ratings of processes categorized by system memory state.

FIG. 7 illustrates an example format 700 for displaying representations of memory usage ratings of processes categorized by system memory state. Example format 700 may include memory usage rating indicator bars 701a, 703a, and 705a, and system memory state identifiers 707a and 707c.

The memory usage rating indicator bars 701a, 703a, and 705a may be indicative of respective portions of a memory usage rating of process A that are attributed to instances when Process A was running during certain system memory states. A system memory state may indicate an amount of unused memory of the computing device or may indicate that more or less than a predetermined number of processes are collectively using the system memory. For example, the memory usage rating indicator bar 705a may represent a portion of the memory usage rating associated with process A when process A was running during system memory state z. The system memory state identifier 707c may be indicative that the memory usage rating indicator bar 705a represents a portion of the memory usage rating of process A that is attributed to instances when process A was running during system memory state z.

For example, system memory state z may represent an instance when an amount of unused memory on the computing device is less than a predetermined value, or may indicate that more or less than a predetermined number of processes are collectively using the memory of the computing device. As a further example, the memory usage rating indicator bars 701a, 703a, and 705a may together indicate that the memory usage rating for Process A is approximately 95% of available memory of the computing device during the time of interest. The memory usage rating indicator bar 701a may indicate that approximately 30% of the memory usage rating of 95% is attributable to instances when Process A was running during system memory state x. The memory usage rating indicator bar 703a may indicate that approximately 30% of the memory usage rating of 95% is attributable to instances when Process A was running during system memory state y. The memory usage rating indicator bar 705a may indicate that approximately 40% of the memory usage rating of 95% is attributable to instances when Process A was running during system memory state z. The system memory state identifier 707a may be indicative that the memory usage rating indicator bar 701a represents the portion of the memory usage rating that is attributed to instances when process A was running during system memory state x. Displaying memory usage rating indicator bars may be helpful to understand which processes are running when an available storage space of a RAM is in a non-optimal state or when more or less than a predetermined amount of processes have access to system memory.

The memory usage rating indicator bars may be displayed on the interactive display screen of the computing device and be configured to receive tactile input. For example, based on receiving tactile input at the memory usage rating indicator bar 701a, the computing device may display memory usage rating indicator bars for respective processes specifically corresponding to a system memory state indicated by the memory usage rating indicator bar 701a. For example, upon receipt of an input at the memory usage rating indicator bar 701a, the computing device may display memory usage rating indicator bars corresponding to time periods when respective processes were running in system memory state x.

Figure 8:
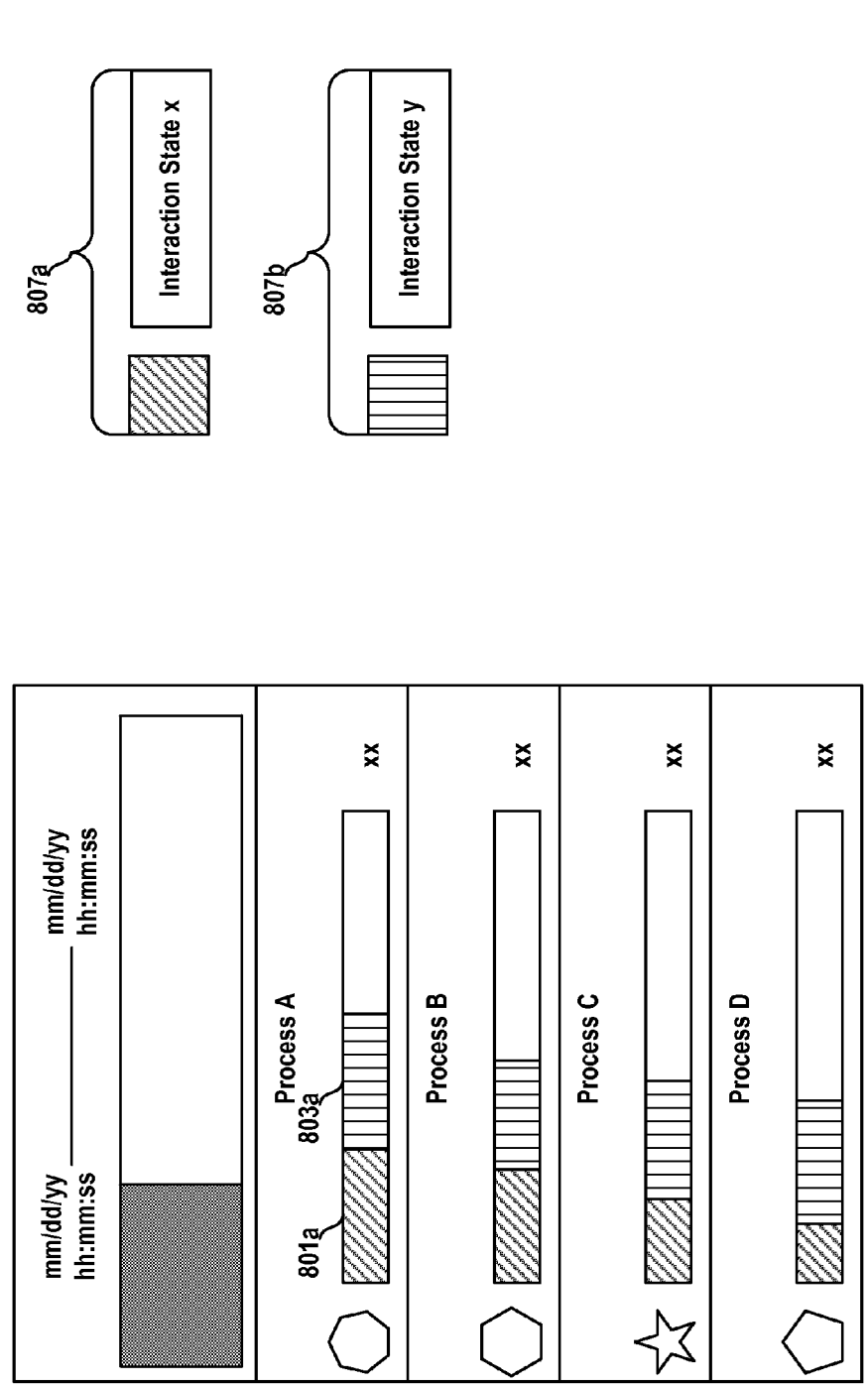
FIG. 8 illustrates an example format for displaying representations of memory usage ratings of processes categorized by interaction state.

FIG. 8 illustrates an example format 800 for displaying representations of memory usage ratings of processes categorized by interaction state. Example format 800 may include memory usage rating indicator bars 801a and 803a, and interaction state identifiers 807a and 807b.

For example, the memory usage rating indicator bar 801a may represent a portion of the memory usage rating associated with process A when process A was running in interaction state x. The interaction state identifier 807a may be indicative that the memory usage rating indicator bar 801a represents the portion of the memory usage rating that is attributed to instances when process A was running in interaction state x. The interaction state identifier 807b may be indicative that the memory usage rating indicator bar 803a represents a portion of the memory usage rating that is attributed to instances when process A was running in interaction state y. In a further example, the memory usage rating indicator bars 801a and 803a may together indicate that the memory usage rating for Process A is approximately 60% of available system memory resources during the time of interest. Additionally, the memory usage rating indicator bars 801a and 803a may collectively indicate that the memory usage rating for Process A is approximately 60% of the system memory actually consumed during the time of interest. The memory usage rating indicator bar 801a may indicate that approximately 50% of the memory usage rating of 60% is attributable to instances when Process A was running in interaction state x. The memory usage rating indicator bar 803a may indicate that approximately 50% of the memory usage rating of 60% is attributable to instances when Process A was running in interaction state y. For example, interaction state x may indicate an instance when the CPU is receiving or providing data to or from a user input/output interface while interaction state y may indicate an instance when the CPU is not receiving or providing data to or from the user input/output interface. Displaying memory usage rating indicator bars may be helpful to understand whether processes are consuming the most memory in interacting or non-interacting states.

The memory usage rating indicator bars may be displayed on the interactive display screen of the computing device and be configured to receive tactile input. For example, based on receiving tactile input at the memory usage rating indicator bar 801a, the computing device may display memory usage rating indicator bars for respective processes specifically corresponding to an interaction state indicated by the memory usage rating indicator bar 801a. For example, the memory usage rating indicator bar 801a may represent an amount of time that Process A has run in interaction state x. Upon receipt of an input at the memory usage rating indicator bar 801a, the computing device may display memory usage rating indicator bars corresponding to time periods when respective processes were running in interaction state x.

Figure 9:
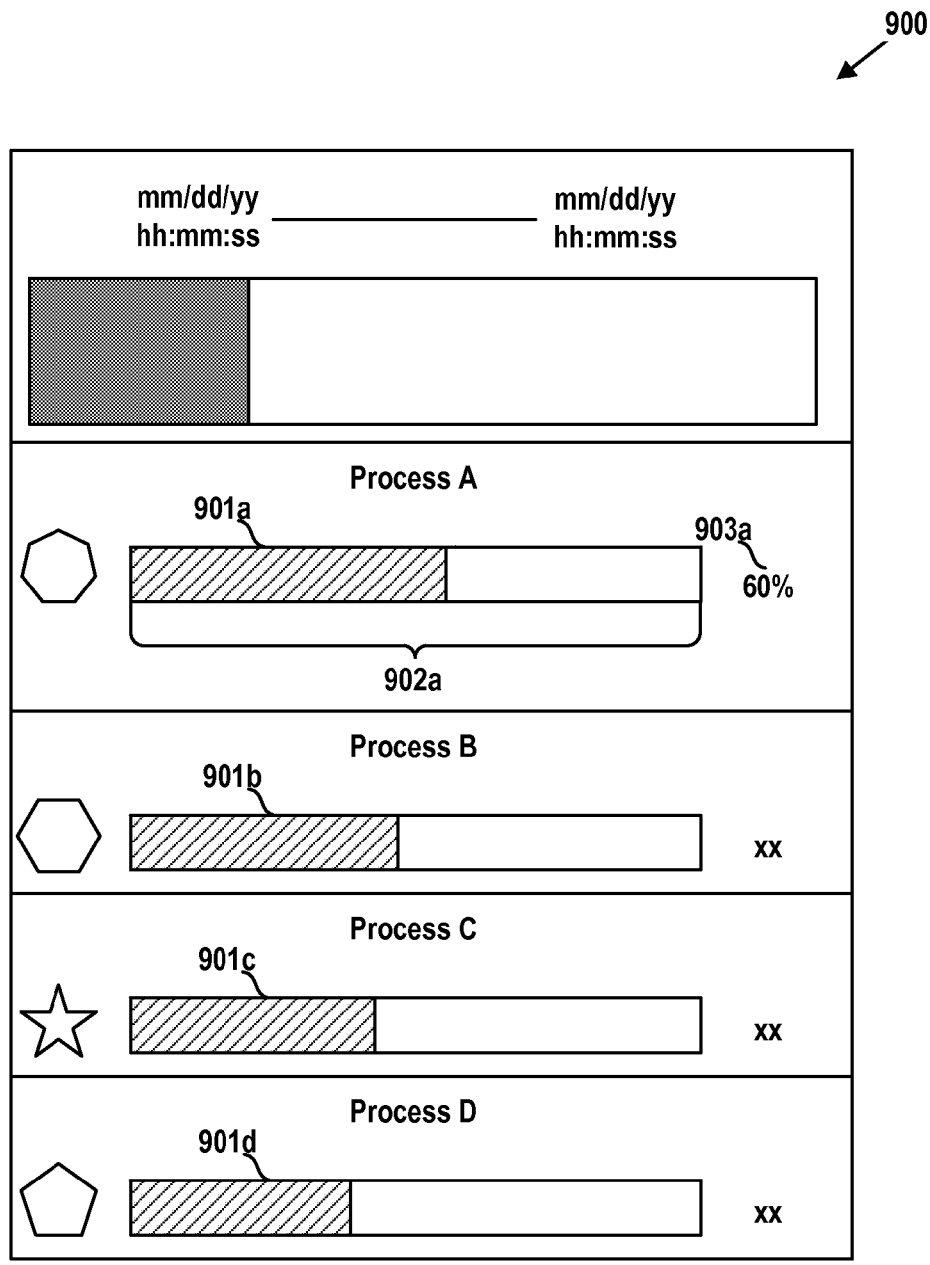
FIG. 9 illustrates an example format for displaying representations of process run times.

FIG. 9 illustrates an example format 900 for displaying representations of process run times. Example format 900 may include run time indicator bars 901a-d and run time indicator 903a. For example, the run time indicator bar 901a may appear to span approximately 60% of a space allotted 902a. This may be indicative that process A has run for 60% of the time period of interest. Alternatively, the run time indicator bar 901a may represent an absolute runtime and may only have discernible meaning by comparing to the other run time indicator bars 901b-d, or by comparing to the corresponding process run time indicator 903a. The process run time indicator 903a may indicate a percentage of the time period of interest that process A has ran, or alternatively, may indicate an absolute run time for process A during the time period of interest. Displaying run time indicator bars may be useful in determining which processes are running often.

Figure 10:
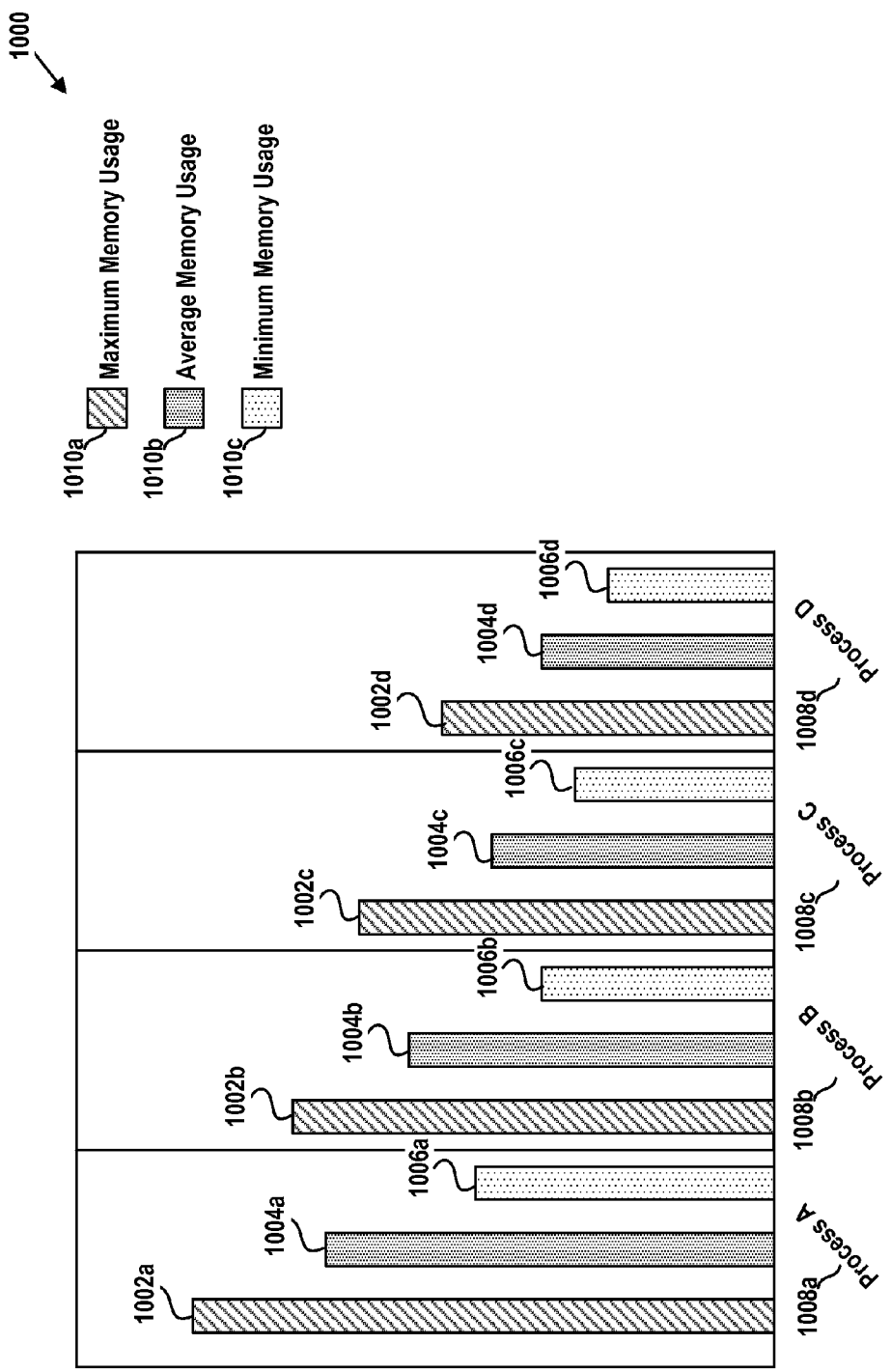
FIG. 10 illustrates an example format for displaying representations of minimum, maximum, and average memory usage values for processes.

FIG. 10 illustrates an example format 1000 for displaying representations of minimum, maximum, and average memory usage values for processes. Example format 1000 may include memory use indicator bars 1002a-d, 1004a-d, 1006a-d, and memory usage keys 1010a-c. The memory use indicator bars 1002a, 1004a, and 1006a may be respectively indicative of the maximum, average, and minimum memory used by process A during the time period of interest. For example, memory use indicator bar 1002a may appear to span a larger distance than memory use indicator bars 1002b-d, meaning that the maximum memory usage value corresponding to process A is larger than those corresponding to processes B, C, or D. The memory usage key 1010a may indicate that the memory use indicator bars 1002a-d are indicative of respective maximum memory usage values of processes A, B, C, and D. The memory usage key 1010b may indicate that the memory use indicator bars 1004a-d are indicative of respective average memory usage values of processes A, B, C, and D. The memory usage key 1010c may indicate that the memory use indicator bars 1006a-d are indicative of respective minimum memory usage values of processes A, B, C, and D, respectively.

The memory use indicator bars 1002a, 1004a, and 1006a may also be indicative of a maximum, average, and minimum memory used by process A during the time period of interest, while running on multiple computing devices. A display may be implemented by computing device 102 or server 104, as shown and described in FIG. 1. Displaying memory use indicator bars may be useful in determining which processes are consuming the most or least system memory on a single device or across multiple devices.

FIG. 11 illustrates an example format 1100 for displaying representations of overall memory usage ratings of processes based on memory usage values aggregated across multiple computing devices, categorized by various states. The example format 1100 may include overall memory usage rating indicator bars 1101a-d, 1103a, and 1105a, and memory usage key 1107a.

The overall memory usage rating indicator bars 1101a, 1103a, and 1105a may be together indicative of an overall memory usage rating of process A, where process A may be running on multiple computing devices during the time period of interest. For example, the memory usage key 1107a may be indicative that the overall memory usage rating indicator bars 1101a-d represent respective portions of the overall memory usage rating for Processes A, B, C, and D that correspond to data category x. Data category x may refer to data that was collected from multiple instances of a certain model of computing device. Data category x may also refer to data that was collected from multiple computing devices running a certain operating system. For example, the overall memory use indicator bar 1101a may be indicative of the overall memory usage rating for Process A running on model x computing devices while the overall memory use indicator bar 1103a may be indicative of the overall memory usage rating for Process A running on model y computing devices. Alternatively, the overall memory use indicator bar 1101a may be indicative of the overall memory usage rating for Process A on devices running operating system x while the overall memory use indicator bar 1103a may be indicative of the overall memory usage rating for Process A on devices running operating system y. Displaying overall memory usage rating indicator bars further categorized by respective model of computing device or operating system may be useful in determining which devices or operating systems are causing certain processes to consume the most or least system memory across many computing devices.

The overall memory usage rating indicator bars may be displayed on the interactive display screen of the computing device and be configured to receive tactile input. For example, based on receiving tactile input at the overall memory usage rating indicator bar 1101a, the computing device may display overall memory usage rating indicator bars for respective processes specifically corresponding to a data category indicated by the overall memory usage rating indicator bar 1101a. For example, the overall memory usage rating indicator bar 1101a may represent an amount of time that Process A has run on multiple instances of a particular model of computing device. Upon receipt of an input at the overall memory usage rating indicator bar 1101a, the computing device may display overall memory usage rating indicator bars corresponding to the particular model of computing device.

Figure 12:
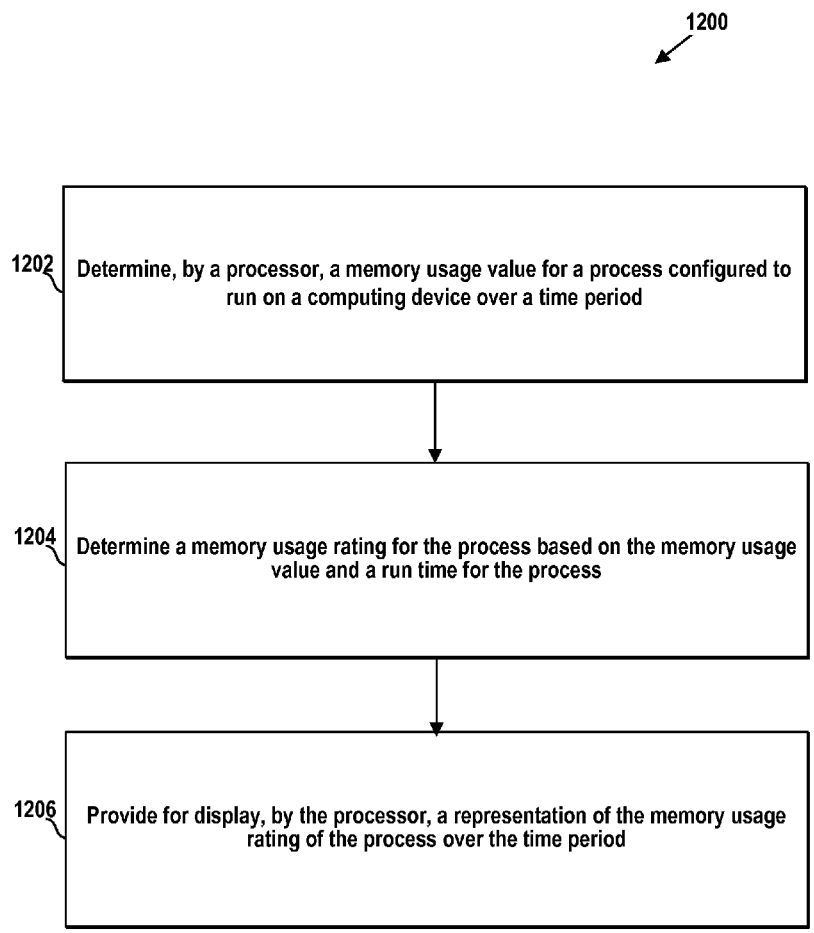
FIG. 12 is a block diagram of an example method for displaying a representation of a memory usage rating of a process over a time period of interest.

FIG. 12 is a block diagram of an example method 1200 for providing for display a representation of a memory usage rating of a process over a time period, in accordance with at least some embodiments described herein. Method 1200 shown in FIG. 12 presents an embodiment of a method that, for example, could be used with a computing device. Method 1200 may include one or more operations, functions, or actions as illustrated by one or more blocks of 1202-1206. Although the blocks are illustrated in a sequential order, these blocks may in some instances be performed in parallel, and/or in a different order than those described herein. Also, the various blocks may be combined into fewer blocks, divided into additional blocks, and/or removed based on the desired implementation.

In addition, for the method 1200 and other processes and methods disclosed herein, the flowchart shows functionality and operation of one possible implementation of present embodiments. In this regard, each block may represent a module, a segment, or a portion of program code, which includes one or more instructions executable by a processor for implementing specific logical functions or steps in the process. The program code may be stored on any type of computer readable medium, for example, such as a storage device including a disk or hard drive. The computer readable medium may include a non-transitory computer readable medium, for example, such as computer-readable media that stores data for short periods of time like register memory, processor cache and Random Access Memory (RAM). The computer readable medium may also include non-transitory media, such as secondary or persistent long term storage, like read only memory (ROM), optical or magnetic disks, compact-disc read only memory (CD-ROM), for example. The computer readable media may also be any other volatile or non-volatile storage systems. The computer readable medium may be considered a computer readable storage medium, a tangible storage device, or other article of manufacture, for example.

In addition, for the method 1200 and other processes and methods disclosed herein, each block in FIG. 12 may represent circuitry that is wired to perform the specific logical functions in the process.

Functions of the method 1200 may be fully performed by a computing device, or may be distributed across multiple computing devices and/or a server. In some examples, the computing device may receive information from sensors of the computing device, or where the computing device is a server the information can be received from another device that collects the information.

At block 1202, the method 1200 includes determining, by a processor, a memory usage value for a process configured to run on a computing device over a time period. The memory usage value may be indicative of an amount of memory of the computing device that the process uses while running. A CPU may perform method 1200 by causing used memory spaces and unused memory spaces to be intermittently analyzed during a time period of interest. The CPU may determine whether a process is running and determine the memory usage value based on how much memory space is consumed by the process when running. The time period of interest may be based on a user input, or a predetermined value.

The method 1200 may also include determining a run time for the process, determining an average memory usage value for the process during the run time, and determining the memory usage value for the process based on the average memory usage value over the run time. The CPU may perform the method 1200 by determining the process run time during the time period of interest, performing at least one measurement of memory use by the process and determining a memory usage value for the process by calculating the average of the measurements of memory use by the process.

The method 1200 may further include determining a run time for the process, determining a maximum memory usage value and a minimum memory usage value for the process during the run time, and determining the memory usage value for the process based on the maximum memory usage value and the minimum memory usage value over the run time. The CPU may perform method 1200 by determining the process run time during the time period of interest, performing at least one measurement of memory use by the process, determining the minimum and maximum memory usage values for the process from the measurements, and determining a memory usage value for the process by calculating the average of the minimum and maximum memory usage values for the process.

At block 1204, the method 1200 includes determining a memory usage rating for the process based on the memory usage value and a run time for the process. The memory usage rating for the process indicates an amount of memory the process uses over the time period and the run time indicates how long the process runs during the time period. To express the memory usage rating in units of megabyte-seconds, the CPU may multiply the memory usage value for the process by the process run time. To express the memory usage rating as a percentage of total memory consumed on the computing device during the time period of interest, the CPU may further divide the multiplicative product of the memory usage value and the run time by the total amount of memory consumed on the computing device and the duration of the time period of interest.

At block 1206, the method 1200 includes providing for display, by the processor, a representation of the memory usage rating of the process over the time period. Examples of representations of memory usage ratings may include memory usage rating indicator bars 508*a-d*, as shown and described in FIG. 5, 601*a-c*, 603*b-c*, and 605*b-c*, as shown and described in FIGS. 6, 701*a*, 703*a*, and 705*a*, as shown and described in FIG. 7, and 801*a*, and 803*a*, as shown and described in FIG. 8. A CPU may cause an output device to present a display representing a memory usage rating.

Method 1200 may also include determining respective memory usage values for respective processes configured to run on the computing device over the time period. The memory usage values may be indicative of amounts of memory of the computing device that respective processes use while running. A CPU may perform method 1200 by performing a plurality of measurements for the respective processes indicative of how much memory each process is using at a given instant during a time period of interest.

The method 1200 may also include determining memory usage ratings for the respective processes based on the memory usage values corresponding to each process and respective run times for the processes. The respective memory usage ratings for the processes may be indicative of amounts of memory the respective processes use over the time period. A CPU may perform method 1200 by multiplying the respective memory usage values by the process run times for respective processes.

In some examples, the method 1200 may also include providing for display a listing of the plurality of processes and associated respective memory usage ratings. A CPU may cause a display screen to display representations of the plurality of processes and respective memory usage ratings.

The method may also include determining a system memory state that the computing device is in during the time period. The system memory state may indicate whether an amount of processes accessing memory on the computing device is within a predetermined range. For example, system memory states may indicate whether certain processes impacting system performance have access to system memory. The method may further include providing for display a representation of an indicator indicating the system memory state the computing device is in during the time period. The display may include a one or more bar graphs indicating the time the computing device is in certain system memory states.

Additionally, the computing device may include an interactive display screen that displays the indicator. The method may also include receiving an input at the indicator, indicating to display a portion of the representation of the memory usage rating. The portion may specifically represent memory use by the process while the computing device is in the system memory state. Portions of memory usage ratings representing certain system memory states may be displayed on the interactive display screen based on receiving the input.

In further examples, the method 1200 may also include, after the expiration of a given time period, storing the memory usage rating of the process and accumulating new data for determination of a new memory usage value and a new memory usage rating over a subsequent time period.

In other examples, the method 1200 may also include determining, from a plurality of states, a given state that the process is in while running. A CPU may perform method 1200 by inspecting the process to determine the state, such as by reviewing inputs to the process or outputs from the process, for example. The CPU may also inspect the process to determine the state by inspecting dependencies other processes have on features provided by the process that may impact the state of the process. Once the state is known, the memory usage rating for the process can be allocated based on the given state that the process is in while running and an indication of the given state that the process is in over the time period can be provided in the representation. The representation may also include an indication of the plurality of states and an amount of memory usage per state. Memory usage values for the process for each state can be aggregated per state as well.

Furthermore, the interactive display screen may display the indication of the given state and amounts of memory usage per state. The method may further include receiving an input at the indication indicating to display a portion of the representation of the memory usage rating. The portion of the memory usage rating may specifically represent memory use by the process while the process is in the given state. It may be useful to display memory usage ratings of a plurality of processes pertaining only to a single process state.

The method may also include determining an amount of time that a process is running in a background on the computing device and determining an average proportional set size (PSS) of the process. The method may also include determining a background memory usage value for the process based on the amount of time that the process is running in the background on the computing device and the average PSS of the process, and providing an indication of the background memory usage value for the process in the representation. The PSS may include an amount of memory used by the process and shared with one or more other processes running on the computing device The method 1200 may also include the operating system determining respective run times of respective processes of the plurality of processes running on the computing device. The operating system may also determine states of the respective processes while running on the computing device and may determine memory usage values for the respective processes per respective states over the time period. The processor may run an operating system and the process may be one of a plurality of processes. It may be useful for the operating system to perform these steps as opposed to another application or process.

The method 1200 may also include determining a memory cost value for the process based on the memory usage value for the process and the time period over which the process is running and using the memory and providing for display in the representation the memory cost value for the process. A CPU may perform method 1200 by characterizing a memory usage value in terms of the cost in relation to available memory which may be a finite resource. For example, the memory cost value may be expressed in units of a currency in a manner that expresses that there is a finite amount of memory available.

Figure 13:
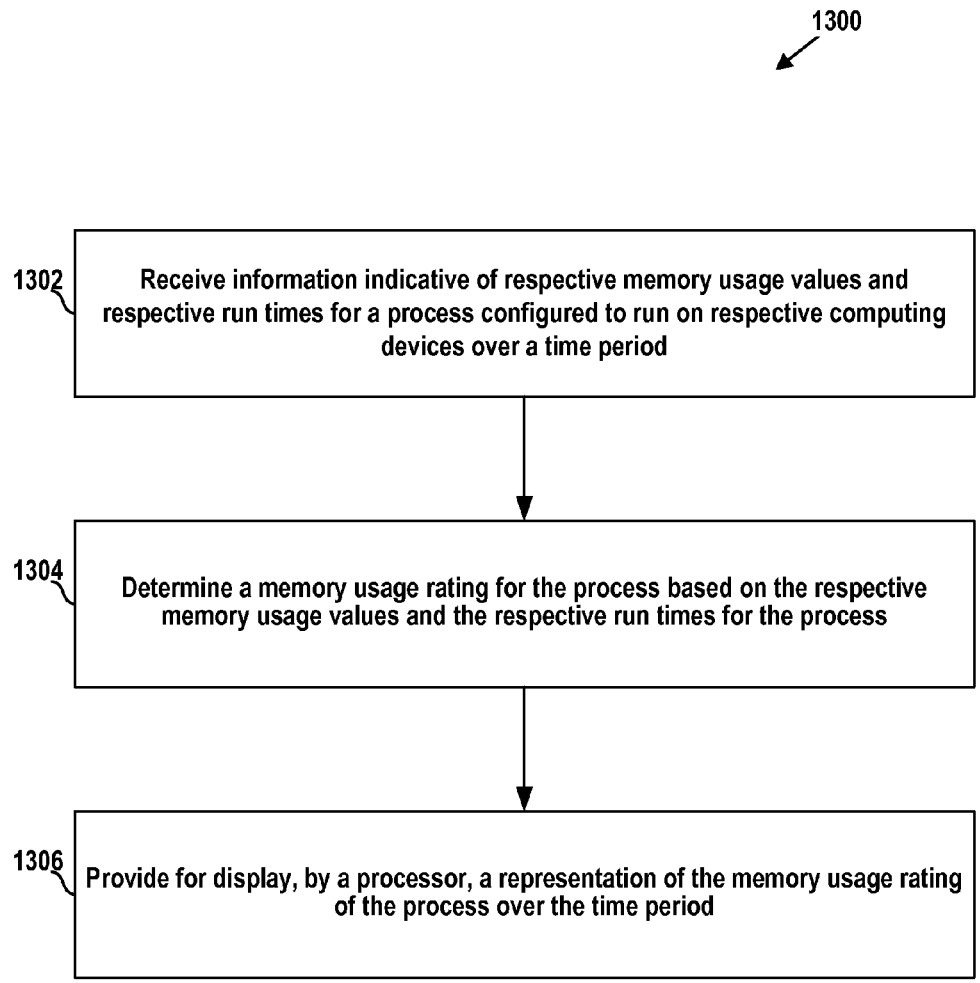
FIG. 13 is a block diagram of an example method for displaying a representation of an overall memory usage rating of a process configured to run on multiple computing devices over a time period of interest.

FIG. 13 is a block diagram of an example method 1300 for displaying a representation of an overall memory usage rating of a process configured to run on multiple computing devices over a time period of interest, in accordance with at least some embodiments described herein. The memory usage rating is associated with a process that is configured to run on multiple computing devices and is indicative of the amount of memory the process uses across multiple computing devices. Method 1300 shown in FIG. 13 presents an embodiment of a method that, for example, could be used with computing device 102 and server 104, as shown and described in FIG. 1. Method 1300 may include one or more operations, functions, or actions as illustrated by one or more blocks of 1302-1306. Although the blocks are illustrated in a sequential order, these blocks may in some instances be performed in parallel, and/or in a different order than those described herein. Also, the various blocks may be combined into fewer blocks, divided into additional blocks, and/or removed based on the desired implementation.

In addition, for the method 1300 and other processes and methods disclosed herein, the flowchart shows functionality and operation of one possible implementation of present embodiments. In this regard, each block may represent a module, a segment, or a portion of program code, which includes one or more instructions executable by a processor for implementing specific logical functions or steps in the process. The program code may be stored on any type of computer readable medium, for example, such as a storage device including a disk or hard drive. The computer readable medium may include a non-transitory computer readable medium, for example, such as computer-readable media that stores data for short periods of time like register memory, processor cache and Random Access Memory (RAM). The computer readable medium may also include non-transitory media, such as secondary or persistent long term storage, like read only memory (ROM), optical or magnetic disks, compact-disc read only memory (CD-ROM), for example. The computer readable media may also be any other volatile or non-volatile storage systems. The computer readable medium may be considered a computer readable storage medium, a tangible storage device, or other article of manufacture, for example.

In addition, for the method 1300 and other processes and methods disclosed herein, each block in FIG. 13 may represent circuitry that is wired to perform the specific logical functions in the process.

Functions of the method 1300 may be fully performed by a computing device, or may be distributed across multiple computing devices and/or a server. In some examples, the computing device may receive information from sensors of the computing device, or where the computing device is a server the information can be received from another device that collects the information.

At block 1302, the method 1300 includes receiving information indicative of respective memory usage values and respective run times for a process configured to run on respective computing devices over a time period. The respective memory usage values may be indicative of amounts of memory of the respective computing devices that the process uses while running. The respective run times may indicate how long the process runs on the respective computing devices during the time period of interest. The respective memory usage values and run times may be received by a CPU or database module of a server.

At block 1304, the method 1300 includes determining a memory usage rating for the process based on the respective memory usage values and the respective run times for the process. The memory usage rating for the process may be indicative of an amount of memory the process uses while running on multiple computing devices during the time period of interest, and may be expressed in units of memory, as a multiplicative product of memory consumed and run time, or as a percentage of a total memory consumed on the computing devices over the time period. The memory usage rating may be determined by a CPU or database module of a server and may pertain to a process running on multiple computing devices. The CPU may calculate the memory usage rating for the process by first calculating memory usage ratings for the process running on each respective computing device, and then calculating an average of the memory usage ratings for the process running on each computing device. For example, the CPU may first calculate a memory usage rating for the process running on a first computing device by multiplying a memory usage value and a run time pertaining to the first computing device. Memory usage ratings for other computing devices may be calculated similarly and an overall memory usage rating may be calculated for the process by calculating an average of the memory usage ratings pertaining to each computing device. To express the memory usage rating as a percentage of total memory consumed on the computing devices during the time period of interest, the CPU may further divide the memory usage value by the total amount of memory consumed on the computing devices and the duration of the time period of interest.

At block 1306, the method 1300 includes providing for display, by a processor, a representation of the memory usage rating of the process over the time period. The representation may be provided by a CPU of a server.

In some examples, the method 1300 may also include providing for display in the representation a respective memory usage rating of the process per type of computing device, and data indicating an average or a maximum memory usage value of the process on the respective computing devices. It may be useful to display information regarding memory usage ratings to show what type of computing devices are causing memory to be consumed across multiple devices. The display output of the representation may resemble an overall memory usage rating indicator bar 1101a, as shown and described in FIG. 11.

The method 1300 may also include providing for display in the representation a respective memory usage rating of the process per version of an operating system running on the computing device.

It should be understood that arrangements described herein are for purposes of example only. As such, those skilled in the art will appreciate that other arrangements and other elements (e.g. machines, interfaces, functions, orders, and groupings of functions, etc.) can be used instead, and some elements may be omitted altogether according to the desired results. Further, many of the elements that are described are functional entities that may be implemented as discrete or distributed components or in conjunction with other components, in any suitable combination and location, or other structural elements described as independent structures may be combined.

While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims, along with the full scope of equivalents to which such claims are entitled. It is also to be understood that the terminology used herein is for the purpose of describing particular embodiments only, and is not intended to be limiting.

What is claimed is:

1. A method comprising:
   determining, by one or more processors, a memory usage value for a process configured to run on a computing device over a time period, wherein the memory usage value is indicative of an amount of memory of the computing device that the process uses while running;
   determining a memory usage rating for the process based on the memory usage value and a run time for the process, wherein the run time indicates how long the process runs during the time period, and wherein the memory usage rating for the process represents a multiplicative product of (i) an amount of memory and (ii) an amount of time; and
   providing for display an indication of the memory usage rating for the process over the time period.

2. The method of claim 1, wherein determining the memory usage value for the process comprises:
   determining an average memory usage value for the process during the time period; and
   determining the memory usage value for the process based on the average memory usage value.

3. The method of claim 1, wherein determining the memory usage value for the process comprises:
   determining a maximum memory usage value and a minimum memory usage value for the process during the time period; and
   determining the memory usage value for the process based on the maximum memory usage value and the minimum memory usage value.

4. The method of claim 1, further comprising:
   determining, from a plurality of system memory states, a given system memory state that the computing device is in during the time period, wherein the given system memory state indicates a number of processes accessing memory on the computing device.

5. The method of claim 4, further comprising:
   providing for display a representation of the given system memory state that the computing device is in during the time period.

6. The method of claim 1, further comprising:
   determining respective memory usage values for respective processes configured to run on the computing device over the time period, wherein the respective memory usage values are indicative of amounts of memory of the computing device that the respective processes use while running;
   determining respective memory usage ratings for the respective processes based on the respective memory usage values and respective run times for the respective processes, wherein the respective run times for the respective processes indicate how long the respective processes run during the time period, and wherein the respective memory usage ratings represent respective multiplicative products of (i) an amount of memory and (ii) an amount of time; and
   wherein providing for display the indication of the memory usage rating for the process over the time period comprises providing for display a listing of the respective processes and indications of the respective memory usage ratings.

7. The method of claim 1, further comprising, after expiration of a given time period:
   storing the memory usage rating for the process; and
   accumulating new data for determination of a new memory usage value and a new memory usage rating over a subsequent time period.

8. The method of claim 7, further comprising:
   receiving information indicative of the given time period, wherein providing for display the indication of the memory usage rating of for the process over the time period comprises providing for display a given indication of a given memory usage rating for the process over the given time period.

9. The method of claim 1, further comprising:
   determining, from a plurality of states, a given state that the process is in while running.

10. The method of claim 9, further comprising:
    providing for display in the indication of the memory usage rating for the process an indication of the given state that the process is in during the time period.

11. The method of claim 9, further comprising:
providing for display in the indication of the memory usage rating for the process an indication of the plurality of states and an amount of memory usage per state.

12. The method of claim 9, wherein determining the memory usage value for the process comprises:
determining a given memory usage value for the process for each state of the plurality of states; and
aggregating the given memory usage value for the process for each state of the plurality of states.

13. A method comprising:
determining, by one or more processors, a memory usage value for a process configured to run on a computing device over a time period, wherein the memory usage value is indicative of an amount of memory of the computing device that the process uses while running;
determining a memory usage rating for the process based on the memory usage value and a run time for the process, wherein the run time indicates how long the process runs during the time period, and wherein the memory usage rating for the process represents a multiplicative product of (i) an amount of memory and (ii) an amount of time;
providing for display a first indication of the memory usage rating for the process over the time period;
determining an amount of time that the process is running in a background on the computing device;
determining an average proportional set size (PSS) of the process, wherein the PSS includes an amount of memory used by the process and shared with one or more other processes running on the computing device;
determining a background memory usage value for the process based on the amount of time that the process is running in the background on the computing device and the average PSS of the process; and
providing a second indication of the background memory usage value for the process in the first indication.

14. A non-transitory computer readable storage memory having stored therein instructions, that when executed by one or more processors, cause the one or more processors to perform functions comprising:
determining a memory usage value for a process configured to run on a computing device over a time period, wherein the memory usage value is indicative of an amount of memory of the computing device that the process uses while running;
determining a memory usage rating for the process based on the memory usage value and a run time for the process, wherein the run time indicates how long the process runs during the time period, and wherein the memory usage rating for the process represents a multiplicative product of (i) an amount of memory and (ii) an amount of time; and
providing for display an indication of the memory usage rating for the process over the time period.

15. The non-transitory computer readable storage memory of claim 14, wherein the functions further comprise:
determining respective memory usage values for respective processes configured to run on the computing device over the time period, wherein the respective memory usage values are indicative of amounts of memory of the computing device that the respective processes use while running;
determining respective memory usage ratings for the respective processes based on the respective memory usage values and respective run times for the respective processes, wherein the respective run times for the respective processes indicate how long the respective processes run during the time period, and wherein the respective memory usage ratings represent respective multiplicative products of (i) an amount of memory and (ii) an amount of time; and
wherein providing for display the indication of the memory usage rating for the process over the time period comprises providing for display a listing of the respective processes and indications of the respective memory usage ratings.

16. A system comprising:
one or more processors and
memory configured to store instructions, that when executed by the one or more processors, cause the system to perform functions comprising:
determining a memory usage value for a process configured to run on the system over a time period, wherein the memory usage value is indicative of an amount of memory of the system that the process uses while running;
determining a memory usage rating for the process based on the memory usage value and a run time for the process, wherein the run time indicates how long the process runs during the time period, and wherein the memory usage rating for the process represents a multiplicative product of (i) an amount of memory and (ii) an amount of time; and
providing for display an indication of the memory usage rating for the process over the time period.

17. The system of claim 16, wherein the functions further comprise:
determining, from a plurality of states, a given state that the process is in while running;
determining a given memory usage value for the process for each state of the plurality of states; and
aggregating the given memory usage value for the process for each state of the plurality of states so as to determine the memory usage value for the process.

18. A method comprising:
receiving information indicative of respective memory usage values and respective run times for a process configured to run on respective computing devices over a time period, wherein the respective memory usage values are indicative of amounts of memory of the respective computing devices that the process uses while running, wherein the respective run times indicate how long the process runs on the respective computing devices during the time period;
determining, by one or more processors, a memory usage rating for the process based on the respective memory usage values and the respective run times for the process wherein the memory usage rating represents a multiplicative product of (i) an amount of memory and (ii) an amount of time; and
providing for display an indication of the memory usage rating for the process over the time period.

19. The method of claim 18, further comprising:
providing for display in the indication one or more additional indications of a respective memory usage rating of the process per type of computing device.

20. The method of claim 18, further comprising:
providing for display in the indication one or more additional indications of a respective memory usage rating of the process per version of an operating system running on the respective computing devices.

21. The method of claim 18, further comprising:
  providing for display in the indication one or more additional indications of an average or a maximum memory usage value of the process on the respective computing devices.

\* \* \* \* \*